N. O. NELSON.
VEHICLE RUNNER.
APPLICATION FILED MAY 2, 1922.
1,438,326. Patented Dec. 12, 1922.
2 SHEETS—SHEET 1.
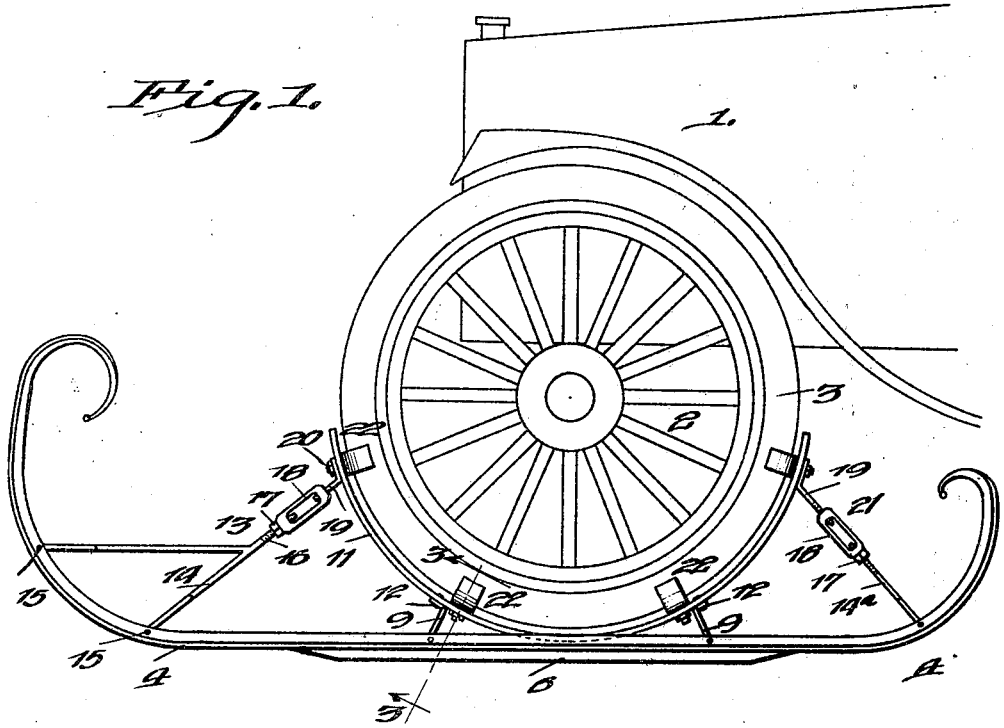
Fig. 1.
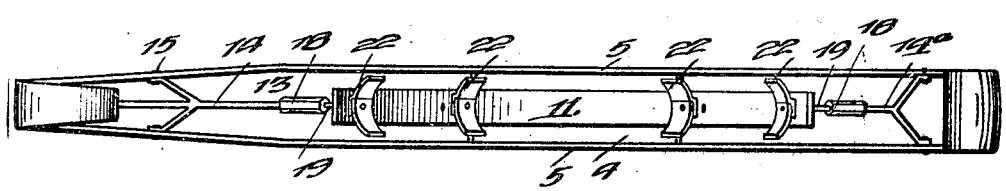
Fig. 2.
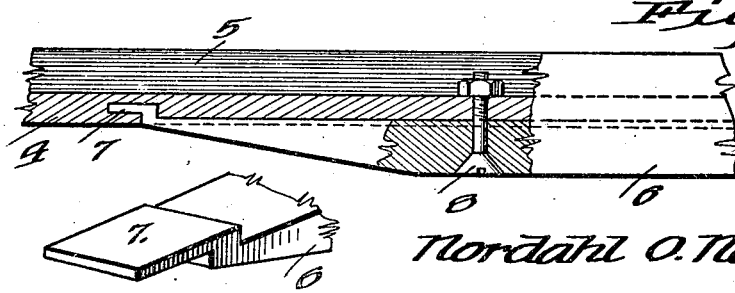
Fig. 5.
Fig. 6.
Inventor
Nordahl O. Nelson
By E. E. Vrooman & Co.,
His Attorneys

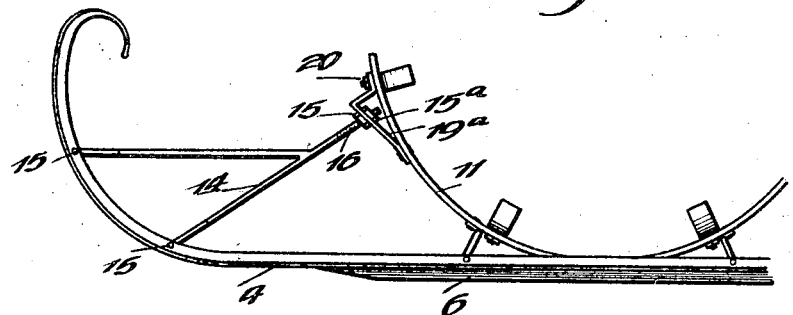
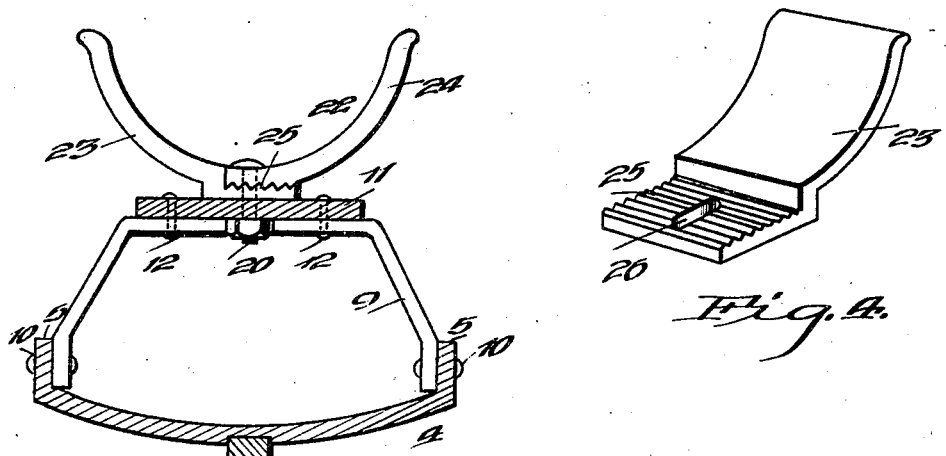
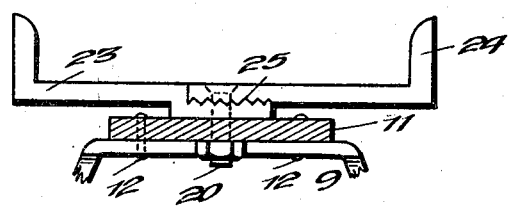

Patented Dec. 12, 1922.

1,438,326

UNITED STATES PATENT OFFICE.

NORDAHL O. NELSON, OF WESTBY, WISCONSIN.

VEHICLE RUNNER.

Application filed May 2, 1922. Serial No. 557,954.

*To all whom it may concern:*

Be it known that I, NORDAHL O. NELSON, a citizen of the United States, residing at Westby, in the county of Vernon and State of Wisconsin, have invented certain new and useful Improvements in Vehicle Runners, of which the following is a specification, reference being had therein to the accompanying drawings.

This invention relates to a vehicle runner, and more particularly to a runner or runner attachment that can be quickly assembled with an automobile wheel.

Another object of the invention is the construction of a simple and efficient runner that can be placed under an automobile wheel, preferably the front wheel, and which will be easy to remove, at the will of the operator.

With these and other objects in view, my invention comprises certain novel combinations, constructions and arrangements of parts as will be hereinafter described, illustrated in the accompanying drawings, and more particularly pointed out in the appended claims.

In the drawings:

Figure 1 is a view, in side elevation, of a device constructed in accordance with the present invention placed under an automobile wheel.

Figure 2 is a top plan view of the device shown in Fig. 1.

Figure 3 is a sectional view, taken on line 3—3, Fig. 1, and looking in the direction of the arrows.

Figure 4 is a perspective view of the primary section of the tire bracket.

Figure 5 is a fragmentary view, partly shown in section and partly in elevation, of the runner frame and the shoe.

Figure 6 is a fragmentary, perspective view of the shoe, showing particularly one end thereof.

Figure 7 is a fragmentary view, in elevation, of a modified form of the device, showing particularly another form or type of the front brace device.

Figure 8 is a modified form of the runner frame.

Referring to the drawings by numerals 1 designates the automobile, and 2 is the wheel thereof. The wheel 2 includes the usual pneumatic tire 3.

My device comprises a runner frame 4 provided with flanges 5, formed along its sides or edges. A shoe 6 is placed against the under face of the runner frame. The shoe 6 is provided with angle ends 7 imbedded in the frame 4, Figs. 5 and 6; by placing the ends of shoe 6 in the frame, such objects as sticks or the like cannot catch or hang in the shoe. I use suitable fastening means, such as bolts 8, Fig. 5, for attaching the shoe 6 to the frame 4.

A pair of yokes 9 are used; the lower ends of the yokes are placed against the inner faces of the flanges 5, Fig. 3, and by means of rivets 10, the yokes are fastened to the flanges.

A curved plate 11 is fastened by rivets 12 to the top of the yokes 9.

A front brace device 13 is employed, this brace device including a Y-shaped frame 14 having its outer ends fastened at 15—15 to the runner frame 4. The inner end of frame 14 is threaded, at 16, Fig. 1, and on this threaded end is lock nut 17 and turn buckle 18. A bracket 19, with an outer threaded end, is fastened at 20 to plate 11, and the turn buckle 18 is threaded upon bracket 19, whereby, upon screwing outwardly upon nut 17, the turn buckle can be rotated to adjust the relative position of the upper end of plate 11 to a nicety, for the purpose hereinafter specified.

In the embodiment shown in Fig. 7, the Y-shaped frame 14 extends through an angle bracket 19$^a$, and a second lock nut 15$^a$ is placed within the angle bracket upon the outer end of frame 14. By loosening nuts 15 and 15$^a$ the upper front end of curved plate 11 can be adjusted, relative to a tire 3, and then upon tightening the lock nuts 15 and 15$^a$, the plate will be held in its adjusted position.

The rear brace device 21 comprises a bracket 19 and a frame 14$^a$ upon which bracket and frame is a turn buckle 18, just like the turn buckle that constitutes a part of the front brace device 13. The lock nut 17 retains the turn buckle 18 in an adjusted position, upon bracket 19 and frame 14$^a$.

A plurality of sectional tire brackets 22 are fastened to the upper face of the curved plate 11. Each bracket 22 includes a primary section 23, and an auxiliary section 24; these sections are provided with corrugations or toothed portions 25, upon their meeting edges, so that when bolt 20 is tightened the sections of the bracket will be securely held together. These sections may be adjusted, one upon the other, by reason of an elongated slot 26, being formed in the primary section 23, and parallel with the longitudinal axis of said section. It will, therefore, be seen that I have provided, not only a sectional bracket, but an adjustable bracket, to accommodate different size tires. After a wheel, with its tire 3, has been placed against the brackets 22, the lock nuts 17 can be moved to permit the turn buckles to be adjusted, then the turn buckles may be rotated to cause the brackets 22 to snugly engage the tire, whereupon, the nut 17 can be tightened against the turn buckles and hold same in their adjusted position, so that the device will fit the tire to a nicety.

In Fig. 8 I have shown a modified form of my device, the change being merely a matter of design, for accommodating flat truck tires, or my runner device to the tires of an ordinary automobile, such as a touring car, or can be applied against the tires of a truck motor vehicle.

While I have described the preferred embodiments of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a device of the class described, the combination of a runner frame, a shoe against said runner frame, said shoe provided with angle ends extending into the runner frame, and wheel supporting means secured to the runner frame.

2. In a device of the class described, the combination of a runner frame, a shoe against the under face of said runner frame, said shoe provided at its end with angular portions countersunk in the runner frame, transverse fastening means extending through the shoe and runner frame, and wheel supporting means attached to the runner frame.

3. In a device of the class described, the combination of a runner frame provided with flanged sides, a curved plate positioned between the flanged sides of the runner frame, means adjustably fastening the ends of the curved plate to the runner frame, and tire holding brackets fastened to the plate.

4. In a device of the class described, the combination of a runner frame, yokes secured to said runner frame, a curved plate secured to said yokes, adjustable means connecting the ends of the plates to the runner frame, and tire brackets on the plate.

5. In a device of the class described, the combination of a runner frame provided with flanged sides, yokes having their ends engaging said sides, means fastening the ends of the yokes to said flanged sides, a plate fastened to the top of the yokes, and tire brackets on said plate.

6. In a device of the class described, the combination with a runner frame, of a curved plate supported on said runner frame, and adjustable sectional brackets fastened to said curved plate.

7. In a device of the class described, the combination with a runner frame, a plate supported by said runner frame, an adjustable tire supporting bracket on said plate, said bracket comprising a primary and an auxiliary section, said sections provided with corrugations or teeth on their meeting edges, one of said sections provided with an elongated slot, and fastening means extending through said sections and said slot and adjustably securing the sections together.

8. In a device of the class described, the combination with a runner frame, a pair of brace devices connected to said runner frame and to said plate, one of said brace devices comprising an angle bracket secured directly to the plate, a frame secured to the runner frame and provided with a portion extending through the angle bracket, locking means on the extended portion of said frame against said angle bracket, and tire supporting means on said plate.

9. In a device of the class described, the combination with a runner frame, a curved plate mounted upon said runner frame, a front brace device interposed between said runner frame and said plate, said brace device comprising a Y-shaped frame provided with an inner threaded end, an angle bracket secured against the plate, said threaded end of the frame extending through the angle bracket, lock nuts on opposite sides of said bracket and on said threaded end of the frame, and tire supporting brackets on the plate.

In testimony whereof I hereunto affix my signature.

NORDAHL O. NELSON.